Nov. 23, 1954    L. J. KMIECIK    2,695,032
PRESSURE RELIEF VALVE
Filed Oct. 31, 1951
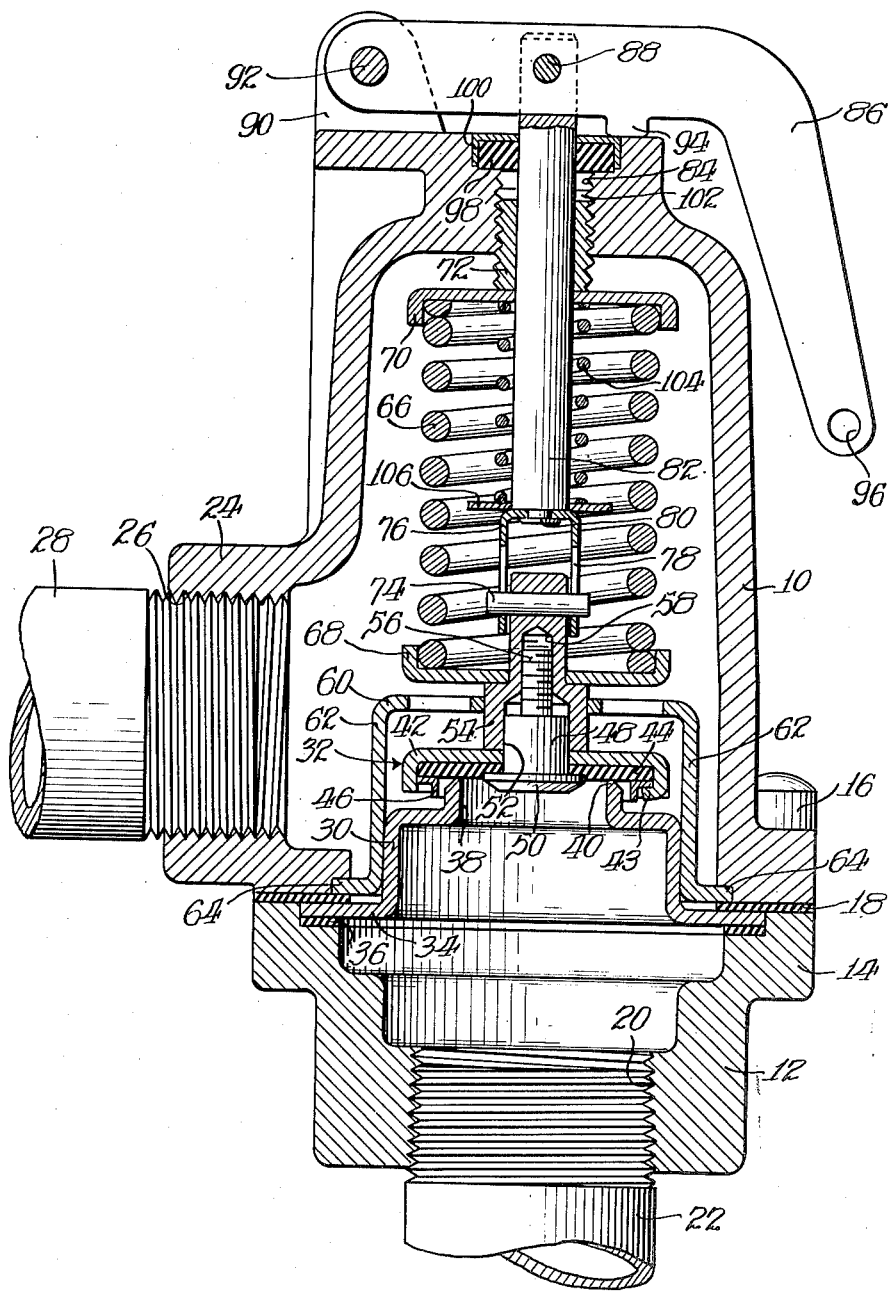
INVENTOR.
Leopold J. Kmiecik
BY
Attys:

… … … … …

United States Patent Office 2,695,032
Patented Nov. 23, 1954

2,695,032

PRESSURE RELIEF VALVE

Leopold J. Kmiecik, Chicago, Ill., assignor to Mcdonnell & Miller, Inc., Chicago, Ill., a corporation of Delaware Application October 31, 1951, Serial No. 254,080

10 Claims. (Cl. 137—469)

The present invention relates to an improvement in pressure relief valves adapted for use with fluid pressure tanks and systems.

An object of the present invention is the provision of an improved pressure relief valve of economical manufacture and maintenance that is positive and accurate in action and designed for continued use throughout substantially the life of the tank or physical elements of the system with which associated.

Another object of the invention is the provision of an improved pressure relief valve of economical and compact structure including means for accurately calibrating the valve throughout a wide range of pressures whereby the valve is adapted for use in a variety of installations.

A further object of the invention is to provide an improved pressure relief valve including huddling chamber means on the valve means thereof to increase the accuracy and positiveness of action of the valve so that same be accurately calibrated for use in any one of a variety of installations.

Other objects and advantages of the present invention will become apparent in the following detailed description of a preferred embodiment of the invention, wherein reference is made to the accompanying drawing showing the pressure relief valve of the present invention in vertical cross-section.

Referring now to the drawing, the fluid pressure relief valve of the present invention comprises a two piece body formed of a generally tubular body portion 10 and a tubular base portion 12. The base 12 is provided at its upper end with an outwardly extending radial flange 14 adapted to mate with the lower surface of the body 10 and adapted to be suitably secured thereto by means of a plurality of machine screws 16. To seal the body 10 and the base 12 with respect to one another, a suitable resilient annular gasket 18 may be disposed between the flanged portion of the body 10 and the flanged portion 14 of the base 12. The base 12 is provided with a central threaded bore 20 constituting an inlet to the valve body and adapted for the reception of an inlet pipe or conduit 22 which is in communication with a pressure tank or fluid pressure system with which the valve of the present invention is adapted to be associated. The tubular body portion 10 is provided with an outwardly extending radial boss 24 within which a threaded bore 26 is formed, the bore constituting a fluid outlet for the body of the valve. The threaded bore 26 is adapted for the reception of an outlet pipe or conduit 28 which may suitably lead to a point of drainage or the like.

Valve means in the form of generally tubular valve seat member 30 and a cup-shaped valve member 32 are disposed between the fluid inlet 20 and the fluid outlet 26 and are adapted to control flow through the valve. The tubular valve seat member 30, a metal stamping, is provided at its lower end with an outwardly extending radial flange 34 which is received in an annular recess in the base 12 and is confined between the body 10 and the base 12. The valve seat member 30 is sealed with respect to the base 12 and the body 10 by means of the annular gasket 18 and a second annular gasket 36 positioned between the flange 34 of the valve seat member 30 and the base 12. At its upper end, the valve seat member or stamping 30 has a portion 38 of reduced diameter which, at its upper end, presents an annular edge 40 comprising a valve seat. The edge 40 is preferably rounded to provide a smooth valve seat. The exterior or peripheral portion of the reduced extension 38 of the valve seat member adjacent the valve seat 40 is tapered toward the valve seat, the taper being disposed preferably at an inclination of approximately 45° to the wall of the reduced extension 38. The purpose of the tapered portion of the valve seat member will be explained in detail hereinafter.

The valve member 32 comprises an inverted cup-shaped metallic member or metal stamping 42 adapted for the reception of an annular sealing disc 44 and a stamped annular angle member 46. The annular angle member or stamping 46 is adapted to be secured within the cup-shaped metallic member 42 in any customary manner, such, for example, as by peening or crimping over portions of the cup, as at 43, after the angle member is inserted in the cup. The angle member serves to secure the peripheral portions of the sealing disc 44 in the cup-shaped member 42. The annular angle member 46 includes a radial flange portion and a depending flange portion coaxial or concentric with and adapted to encircle the reduced extension 38 of the valve seat member adjacent the valve seat 40, the depending flange being spaced radially from the peripheral margin of the reduced extension 38 so as to provide a huddling chamber action, as will be explained in detail hereinafter. The disc 44 is adapted for cooperation with the valve seat 40 to sealingly close the valve, the rounded edge of the valve seat preventing cutting and rapid deterioration of the seal 44.

The cup-shaped member 42 and the annular seal 44 are provided with central apertures adapted for the reception of a first cylindrical stem member 48 which is provided with a head 50 engaging and sealing with the lower surface of the seal 44. The first stem member 48 is slidably received in a counterbore 52 in a second tubular stem member 54 and is provided with a threaded reduced extension or end portion 56 adapted to be secured within a threaded bore 58 in the second stem member 54. The stem members 48 and 54 comprise a stem for the valve 32. The stem of the valve is guided for reciprocal sliding movement within a bore in a U-shaped guide strap 60. The guide strap 60 includes depending legs 62 having an outwardly extending flange 64 at the lower end of each leg. The legs 62 of the strap 60 engage the peripheral surface of the valve seat member 30 and the flanges 64 are confined between the body 10 and the base 12 to secure the strap in position to guide the valve member for movement toward and away from the valve seat. The body 10 is preferably provided with a pair of diametrically opposed recesses adapted for the reception of the outwardly extending flanges at the lower ends of the legs 62 of the strap 60. If desired, however, an annular recess may be formed in the body member 10 for the reception of the flanges 64. The flanges of the strap are confined between the body member 10 and the gasket 18 which rests upon the radial flange 34 of the valve seat member 30. The U-shaped strap 60 may be pierced at various places to reduce the resistance to flow through the valve.

The valve 32 is normally held to its seat by means of a spring 66, which is preferably a helically coiled spring. The spring 66 is suitably confined between and retained by a pair of oppositely disposed cup-shaped retainers 68 and 70. The retainer 68 is provided with a central aperture adapted for the reception of a reduced end portion of the stem member 54 and rests on the shoulder of the member 54 provided by the reduced end portion thereof. The retainer 70 engages and is held against movement by a calibrating screw 72 operatively associated with the body 10. The valve 32 is controlled by the spring 66 and is adapted to be automatically opened upon occurrence of fluid pressures within the inlet 20 and the chamber defined by the base 12 and the valve seat member 30 in excess of the calibrated force of the spring 66.

It is preferable to provide manual means for opening the valve to vent the fluid pressure tank or system with which the valve is associated to atmosphere or to a suitable point of drainage. To this end, a transverse bore is provided in the reduced end portion of the second stem member 54 adapted for the reception of a pin 74 having portions extending to either side of the member 54. A U- shaped strap or clevis 76, provided with elongate slots 78 being adapted for the reception of the pin 74 with provision for lost-motion. The strap 76 is secured by a rivet 80 or the like to the lower end of a cylindrical rod or stem 82. The upper retainer 70 is provided with a central aperture and the calibrating screw 72 is provided with an axial bore for the slidable passage therethrough of the stem 82. The body 10 is provided with a bore 84 adapted for the passage of the stem 82 so that the stem 82 extends exteriorly of the body 10 to atmosphere. The stem 82 is adapted to be manually actuated to lift the valve 32 off its seat 30 to vent the pressure chamber in the base member 12. The slots 78 in the legs of the clevis 76 provide a lost-motion connection between the valve stem 54 and the rod 82 so that automatic actuation of the valve 32 under the force of fluid pressure in the chamber in the base 12 will not effect movement of the rod 82. To provide means for effecting manual actuation of the rod 82, the upper end of the rod 82 is bifurcated for the reception of a generally L-shaped lever 86 pivotally connected to the rod 82 by means of a transverse pin 88. The pivotal connection between the rod 82 and the lever 86 may be accomplished in any customary manner, such, for example, as by means of a cotter pin passing through the bifurcated portions of the rod 82 and through a suitable aperture provided in the lever 86. However, a cylindrical pin 88 is shown in the accompanying drawings, the pin being preferably secured to the rod 82 by peening portions of the rod 82 over the apertures through which the pin 88 passes. The lever 86 is pivotally connected at one end to the body 10 and to provide means for effecting the pivotal connection of the body and the lever, the body 10 is preferably provided with an upstanding bifurcated extension 90 adapted for the reception of one end of the lever 86, the pivotal connection being accomplished by means of a pin 92 extending through suitable apertures in the bifurcated portions 90 of the body and through a suitable aperture adjacent one end of the lever 86. The lever 86 is preferably provided with an integral stop portion 94 adapted for engagement with the top surface of the body 10 to limit downward movement of the rod 82. At the end opposite the pivotal connection of the lever 86 to the body 10, the lever 86 is provided with an aperture 96 adapted for the reception of a cord or the like so that the valve may be manually actuated at a considerable distance from the valve.

To seal the rod 82 with respect to the body 10, the body 10 is counterbored coaxially of the bore 84 to provide a recessed portion adapted for the reception of an annular seal 98 engaging the peripheral surface of the rod 82 and engaging the body to provide a seal therebetween. The seal 98 is suitably backed and retained within the body 10 by means of metallic cup-shaped member 100 which suitably may be press fit into the counterbore in the body 10.

The bore 84 in the body 10 is threaded for the adjustable reception of the calibration screw 72. The screw 72 is provided at its upper end with a suitable kerf 102 so that the screw may be engaged by a suitable tool to adjust the position of the screw 72 in the threaded bore 84 so as to vary the degree of compression of the spring 66 and to calibrate the valve.

To maintain the plunger or rod 82 and the lever 86 in the normal position shown in the drawing, a helical spring 104, which is preferably a relatively weak spring, is confined between the retainer 70 and a plate 106 slidable on the rod 82 and engaging the strap 76. After manual actuation of the valve, the lever 86 and the rod 82 will be returned to normal position due to the combined action of the spring 104 and the spring 66 and the valve 32 will be returned to its seat on the valve seat member 30 by means of the spring 66. Upon automatic actuation of the valve, the pin 74 will slide within the slots 78 in the clevis 76 so that the spring 104 will maintain the lever 86 and the rod 82 in the normal position shown in the drawing.

In operation, as fluid pressure within the chamber in the base 12 reaches a certain magnitude, determined by the compressive force exertion of the spring 66, the valve 32 will be automatically opened. In other words, as the fluid pressure within the chamber in the base 12 acting upon the exposed area of the valve 32 is sufficient to overcome the spring 66, the valve 32 will be opened to vent the pressure system or tank with which associated, or to establish communication between the inlet pipe 22 and the outlet pipe 28. In early pressure relief valves, the valve was designed so that the area of the valve exposed to fluid pressures within the pressure system was the same after opening as before. Since the area exposed to the fluid pressure was the same after opening as before, the valve would normally open to only a very slight extent and would readily return to its seat so that actuation of the valve was frequent and rapid. Due to the narrow opening of the valve, the escaping fluids would pass over the surface of the valve at such velocity as to create a problem commonly referred to as wire drawing. Furthermore, the valve in its rapid actuation away from and immediately back to its seat created a chatter, rapid deterioration of the valve and inefficient relief of the pressure system with which associated. To overcome these disadvantages, several later pressure relief valves provided a valve member which would have a greater area exposed to the fluid pressure within the system immediately after opening than while closed, so that the pressure in the system acting upon the greater exposed area of the valve would rapidly move the valve to a fully open position in which adequate and substantially complete pressure relief of the system would be effected. These valves constituted a substantial improvement in the art, since the wide opening of the valve provided substantial pressure release, lessened the frequency of actuation of the valve, reduced chattering and, due to the large opening of valve, reduced the occurrence of wire drawing. However, these later valves were not entirely satisfactory, since the effective opening of the valve to its full extent was not always accomplished in the desired or theoretical manner, which led to substantially all of the disadvantages that had been suffered with earlier pressure relief valves. To overcome these disadvantages and to insure automatic actuation of the valve to a fully open position, I provide a valve having a surface area exposed to fluid pressure greater after opening than before opening and in addition provide means for accomplishing a huddling chamber effect to insure exertion of force on the greater exposed area of the valve member so that same is moved to its full open position at each actuation. To provide this huddling chamber effect, the annular angle member 46 has a depending flange portion encircling and spaced radially from the reduced tubular portion 38 of the valve seat member 30. The depending flange of the angle member 46 extends to a substantial extent below the valve seat 40 of the member 30 so that fluids escaping from the valve seat member after initial opening of the valve will necessarily exert pressure upon the increased exposed area of the valve member before passage to the outlet pipe 28 of the valve. In other words, the depending flange of the angle member together with the reduced tubular extension 38 of the valve seat member 30, define a restricted path of fluid flow so that fluid passing through the valve seat member will be confined or substantially confined within the area of the increased exposed portion of the valve until the valve has been moved to a sufficient extent to raise the depending flange of the angle member 46 to or above the tapered portion of the valve seat member. The tapered portion of the valve seat member acts to increase the area or size of the path of fluid flow as the valve member moves away from its seat and thus facilitates the rapid escape of fluid after the valve is fully open so that the pressure system with which the valve is associated may be completely and quickly vented. To restate the function of the depending flange portion of the angle member 46, the depending flange portion in cooperation with the reduced tubular portion 38 of the valve seat member 30 provides a restricted area of fluid escape after the valve has been slightly opened, so that the fluid must exert pressure on the increased area of the valve member to rapidly and effectively move the valve member to a fully open position, at which time the depending flange portion of the angle member 46 will be raised clear of the tubular portion 38 of the valve seat member so that the fluid may escape to the outlet pipe 28 past the tapered portion of the valve seat member.

While it is difficult to state a proportionate ratio between the relative dimensions of the valve seat, the valve and the size and spacing of the annular angle member, I have found that with the inner diameter of the reduced tubular portion 38 of the valve seat member being ⅝ of one inch, the dimensioning of the angle member 46 is preferably such that the depending flange of the angle member is spaced radially from the tubular wall of the reduced extension 38 by a distance of 1/32 of one inch and the length of the depending flange is 3/32 of one inch. With these dimensions, the taper of the portion 38 of the valve seat member is preferably 45°. While the foregoing figures are exemplary of typical values for the relative dimensions of the parts, various factors enter into the calculation, such as pressure, the exposed area of the valve before opening and the exposed area of the valve after opening. One decided advantage of the construction of the huddling chamber of the present invention is that it requires no adjustment as compared to conventional huddling chamber constructions wherein adjustment is required.

From the foregoing, it will be appreciated that the present invention provides a pressure relief valve particularly adapted for positive actuation upon the exertion of fluid pressure on the valve member thereof. Positive actuation of the valve by fluids under pressure is insured by the provision of the huddling chamber effect of the present invention. Due to the huddling chamber effect and the positive actuation of the valve to a full open position, the calibration of the valve may be accurately established by adjustment by the calibrating screw 72. Furthermore, the present invention provides a pressure relief valve of extremely economical construction having few wearing parts, the wearing parts being associated with the means of effecting manual actuation of the valve, so that the valve is particularly adapted for utilization over long periods of time, substantially equaling or exceeding the normal life of the pressure tank or physical elements of the pressure system with which the valve is associated.

While I have described what I regard to be a preferred embodiment of my invention, it will be appreciated that various changes, rearrangements and modifications may be made therein without departing from the scope of the present invention, as defined by the appended claims.

I claim:

1. In a fluid pressure relief valve having a fluid inlet and a fluid outlet, in combination, valve seat member disposed between the inlet and the outlet, said member including a tubular portion defining a valve seat at the end thereof to the outlet side of the valve, a valve member movable toward and away from said valve seat, said valve member including a cup-shaped stamping facing said valve seat, a sealing disc positioned in said cup-shaped stamping and an annular angle stamping secured in said cup-shaped stamping and engaging the peripheral margin of said disc to retain said disc in said cup-shaped stamping, said sealing disc being adapted to engage said valve seat to close the valve, said sealing disc and said valve member being of a dimension greater than said valve seat and having a greater area exposed to fluid in the inlet when the valve is opened than when the valve is closed, said angle stamping having a flange concentric with and encircling the tubular portion of said valve seat member and being spaced radially therefrom, said flange and the peripheral wall of said tubular portion of said valve seat member defining a restricted passage for fluid flow, whereby fluid from the inlet will exert pressure over the said greater area of said valve member to fully open said valve member.

2. In a fluid pressure relief valve having a fluid inlet and a fluid outlet, in combination, a valve seat member disposed between the inlet and the outlet, said member including a tubular portion defining a valve seat at the end thereof to the outlet side of the valve, the peripheral wall of said portion of said valve seat member adjacent said valve seat being tapered, a valve member movable toward and away from said valve seat, said valve member including a cup-shaped stamping facing said valve seat, a sealing disc positioned in said cup-shaped stamping and an annular angle stamping secured in said cup-shaped stamping and retaining said disc in said cup-shaped stamping, said sealing disc being adapted to engage said valve seat to close the valve and having a greater area exposed to fluid in the inlet when the valve is opened than when the valve is closed, said angle stamping having a flange concentric with and encircling the tubular portion of said valve seat member, said flange being spaced radially from the tubular portion of said valve seat member and defining therewith a restricted path of fluid flow, whereby fluid in the inlet will exert pressure over the said greater area of said valve member until the valve member is moved to a full open position, said tapered portion of said valve seat member facilitating escape of fluid past said flange of said angle stamping when said valve is moved to a full open position.

3. A fluid pressure relief valve comprising a pair of body members, one having a fluid inlet and the other having a fluid outlet, a valve seat member confined between said body members and defining a valve seat between said inlet and said outlet, a valve member positioned to the outlet side of said valve seat member and movable toward and away from said valve seat, said valve member including a depending flange portion encircling said valve seat member and extending beyond said valve seat, said flange being spaced from said valve seat member and defining therewith a huddling chamber, a stem on said valve, and a strap secured between said body members and having a portion extending to the side of said valve member opposite said valve seat member, the said portion of said strap guiding said valve stem for movement of said valve toward and away from said valve seat.

4. A fluid pressure relief valve comprising a pair of body members, one having a fluid inlet and the other having a fluid outlet, a valve seat member confined between said body members and defining a valve seat between said inlet and said outlet, a valve member positioned to the outlet side of said valve seat member and movable toward and away from said valve seat, said valve member including a depending flange portion encircling said valve seat member and extending beyond said valve seat, said flange being spaced from said valve seat member and defining therewith a huddling chamber, a stem on said valve member, a strap secured between said body members and having a portion extending to the side of said valve opposite said valve seat member, the said portion of said strap guiding said valve stem for movement of said valve member toward and away from said valve seat, a rod operatively associated with said valve stem and extending to the exterior of said body members, and means for effecting manual actuation of said rod to move said valve member away from said valve seat.

5. A fluid pressure relief valve comprising a pair of body members, one having a fluid inlet and the other having a fluid outlet, a valve seat member confined between said body members and defining a valve seat between said inlet and said outlet, a valve member positioned to the outlet side of said valve seat member and movable toward and away from said valve seat, said valve member including a flange portion encircling said valve seat member and extending beyond said valve seat, said flange being spaced from said valve seat member and defining therewith a huddling chamber, a stem on said valve member, a strap secured between said body members and having a portion extending to the side of said valve member opposite said valve seat member, the said portion of said strap guiding said valve stem for movement of said valve member toward and away from said valve seat, a rod operatively associated with said valve stem with provision for lost motion and extending to the exterior of said body members, a lever pivotally connected to one of said body members and to said rod for effecting actuation of said valve, and spring means confined between one of said body members and said valve member for normally maintaining said valve on said valve seat, said valve member being adapted to be moved away from said valve seat by fluid pressure in said inlet, the lost motion connection between said rod and said valve stem accommodating movement of said valve stem with respect to said rod when said valve member is opened by fluid pressure.

6. A fluid pressure relief valve comprising a pair of body members, one having a fluid inlet and the other having a fluid outlet, a valve seat member confined between said body members and defining a valve seat between said inlet and said outlet, a valve member positioned to the outlet side of said valve seat member and movable toward and away from said valve seat, spring means confined between one of said body members and said valve member for normally maintaining said valve member on said valve seat, said valve member being adapted to be moved away from said valve seat by fluid pressure in said inlet, said valve member including a flange portion encircling said valve seat member and extending beyond said valve seat, said flange being spaced from said valve seat member and defining a huddling chamber and a restricted path of fluid flow, said valve member having a greater area exposed to fluid flow when opened than when closed, the restricted path of fluid flow defined by said valve seat member and said flange necessitating the exertion of fluid pressure on the said greater area of said valve member when said valve member is opened to move said valve member a substantial distance from said valve seat, said flange being moved when said valve is moved to full open position to a position out of association with said valve seat member to remove the restriction in the path of fluid flow, a stem on said valve, a strap secured between said body members and having a portion extending to the side of said valve opposite said valve seat member, the said portion of said strap guiding said valve stem for movement of said valve member toward and away from said valve seat, and means operatively associated with said valve stem for effecting manual actuation of said valve member.

7. A fluid pressure relief valve as set forth in claim 3, including means for effecting manual actuation of said valve member, said means including a rod operatively associated with said valve stem with provision for lost motion and extending to the exterior of said body members, and a lever pivotally connected to one of said body members and to said rod for effecting actuation of said valve, the lost motion connection between said rod and said valve stem accommodating movement of said valve stem with respect to said rod when said valve member is opened by fluid pressure.

8. In a fluid pressure relief valve having a fluid inlet and a fluid outlet, in combination, means defining a valve seat between the inlet and the outlet, and a valve member movable toward and away from said valve seat, said valve member being disposed to the outlet side of said valve seat and comprising a cup-shaped stamping facing said valve seat, a resilient sealing disc positioned in said cup-shaped stamping and an annular angle stamping positioned in said cup-shaped stamping and engaging the peripheral margin of said disc to retain said disc in said cup-shaped stamping, said annular angle stamping comprising a radical flange engaging the peripheral margin of said disc and the side of said cup-shaped stamping and an annular axially extending flange spaced inwardly of the sides of said cup-shaped stamping, said annular angle stamping being retained in said cup-shaped stamping by bent portions of the side of said cup-shaped stamping in engagement with the radially extending flange of said annular angle stamping, said sealing disc being adapted to engage said valve seat to close the valve, the axially extending flange of said annular angle stamping encircling and extending beyond said valve seat in the closed position of said valve member, the axially extending flange of said annular angle stamping being spaced radially outwardly of said valve seat and defining therewith a restricted path of fluid flow providing a huddling chamber effect.

9. A fluid pressure relief valve comprising a pair of body members, one having a fluid inlet and the other having a fluid outlet, an annular valve seat stamping confined between said body members and having a tubular portion defining a valve seat between said inlet and said outlet, a valve member positioned to the outlet side of said valve seat stamping and movable toward and away from said valve seat, said valve member comprising a cup-shaped stamping facing said valve seat, a sealing disc positioned in said cup-shaped stamping and an annular angle stamping positioned in said cup-shaped stamping and retaining said disc in said cup-shaped stamping, said annular angle stamping comprising a radially extending flange engaging the peripheral margin of said disc and the side wall of said cup-shaped stamping and an axially extending annular flange disposed inwardly of the side wall of said cup-shaped stamping, said annular angle stamping being retained in said cup-shaped stamping and retaining said disc in said cup-shaped stamping by crimped portions of the side wall of said cup-shaped stamping engaging the radially extending flange of said annular angle member, said sealing disc being adapted to engage said valve seat to close the valve and having a greater area exposed to fluid in the inlet when the valve is open than when the valve is closed, the axially extending flange of said annular angle stamping being concentric with and encircling the tubular portion of said valve seat stamping, the axially extending flange of said annular angle member being spaced radially outwardly from the tubular portion of said valve seat stamping and defining therewith a restricted path of fluid flow, the peripheral wall of the tubular portion of said valve seat stamping adjacent said valve seat being tapered outwardly from said valve seat, whereby fluid in the inlet upon opening of said valve member exerts pressure over the said greater area of said disc to move said valve member to full open position, said tapered portion of said valve seat stamping facilitating a gradual increase in the size of the path of fluid flow as said valve member is moved toward full open position.

10. A fluid pressure relief valve comprising a pair of body members, one having a fluid inlet and the other having a fluid outlet, a valve seat stamping confined between said body members and including a tubular portion defining a valve seat between said inlet and said outlet, a valve member positioned to the outlet side of said valve seat stamping and movable toward and away from said valve seat, said valve member comprising a cup-shaped stamping facing said valve seat, a sealing disc positioned in said cup-shaped stamping, a valve stem extending axially through said disc and said cup-shaped stamping to retain the central position of said disc in said cup-shaped stamping, said valve stem extending to the outlet side of said cup-shaped stamping, and an annular angle stamping positioned in said cup-shaped stamping and engaging the peripheral margin of said disc to retain the peripheral margin of said disc in said cup-shaped stamping, said angle stamping including a radially extending flange engaging the peripheral margin of said disc and the side wall of said cup-shaped stamping and an axially extending annular flange disposed inwardly of the side wall of said cup-shaped stamping, said angle stamping and the peripheral margin of said disc being retained in said cup-shaped stamping by crimped portions of the side wall of said cup-shaped stamping in engagement with the radially extending flange of said angle stamping, said sealing disc being adapted to engage said valve seat to close the valve, said sealing disc having a greater area exposed to fluid in the inlet when the valve is open than when the valve is closed, the axially extending flange of said angle stamping being concentric with and encircling the tubular portion of said valve seat stamping, the axially extending flange of said angle stamping being spaced radially from the tubular portion of said valve seat stamping and defining therewith a restricted path of fluid flow, whereby fluid in the inlet will exert pressure over the said greater area of said disc to move the valve member to full open position, the peripheral wall of said tubular portion of said valve seat stamping being tapered outwardly from said valve seat and facilitating an increase in the size of the path of fluid flow with respect to the axially extending flange of said angle member as said valve member is moved toward full open position, the axially extending flange of said angle stamping being disposed above said valve seat in the open position of said valve member, and a strap confined between said body members and having a portion extending to the outlet side of said cup-shaped stamping, the said portion of said strap having a bore therein for the reception of said valve stem and guiding said valve stem for movement of said valve toward and away from said valve seat.

References Cited in the file of this patent

UNITED STATES PATENTS

| Number | Name | Date |
|---|---|---|
| 162,831 | Kunkle | May 4, 1875 |
| 1,359,169 | Hargreaves | Nov. 16, 1920 |
| 1,972,170 | Spencer | Sept. 4, 1934 |
| 2,072,271 | Meadows | Mar. 2, 1937 |
| 2,226,732 | McBride | Dec. 31, 1940 |
| 2,517,858 | Farris | Aug. 8, 1950 |
| 2,576,517 | Jurs | Nov. 27, 1951 |
| 2,584,715 | Kmiecik | Feb. 5, 1952 |
| 2,601,563 | Selwyn | June 24, 1952 |
| 2,603,231 | Birkemeier | July 15, 1952 |